(12) United States Patent
Long et al.

(10) Patent No.: US 6,388,583 B1
(45) Date of Patent: May 14, 2002

(54) METHOD AND CIRCUIT FOR CODES GENERATION

(75) Inventors: Biqi Long; Changming Zhou, both of Tokyo (JP)

(73) Assignee: Yozan, Inc., Tokyo (JP)

( * ) Notice: Subject to any disclaimer, the term of this patent is extended or adjusted under 35 U.S.C. 154(b) by 7 days.

(21) Appl. No.: 09/588,613

(22) Filed: Jun. 6, 2000

(30) Foreign Application Priority Data

Jun. 7, 1999 (JP) ............................................ 11-158935

(51) Int. Cl.[7] ................................................ H03M 7/00
(52) U.S. Cl. ........................... 341/50; 375/130; 331/78; 708/250; 708/252; 341/50; 341/78; 341/81; 341/82; 341/86
(58) Field of Search ............................. 341/50, 78, 81, 341/82, 86; 375/130; 331/78; 708/250, 252

(56) References Cited

U.S. PATENT DOCUMENTS

| | | | | |
|---|---|---|---|---|
| 5,228,054 A | | 7/1993 | Rueth et al. | |
| 5,311,176 A | * | 5/1994 | Gurney | 341/50 |
| 5,532,695 A | * | 7/1996 | Park et al. | 341/173 |
| 6,069,574 A | * | 5/2000 | Eo et al. | 341/50 |
| 6,141,374 A | * | 10/2000 | Burns | 375/152 |
| 6,188,714 B1 | * | 2/2001 | Yamaguchi | 375/130 |
| 6,212,219 B1 | * | 4/2001 | Shou | 375/130 |

* cited by examiner

*Primary Examiner*—Michael Tokar
*Assistant Examiner*—Khai Nguyen
(74) *Attorney, Agent, or Firm*—Armstrong, Westerman & Hattori, LLP

(57) ABSTRACT

The present invention offers a method and a circuit for generating codes enabling transmission of long-codes to start on a reverse channel in a shorter waiting time. The method involves corresponding a shift quantity between the beginning of a sequence M or long-codes cycle, and each timing to a combination of a plurality of masking data; determining a combination of masking data for timing to start generation of long-codes in response to a transmission request at a point of time as soon as possible; and shifting of an initial value of a vector according to the masking data.

6 Claims, 10 Drawing Sheets

METHOD AND CIRCUIT FOR CODES GENERATION

BACKGROUND OF THE INVENTION

1. Field of the Invention

The present invention relates to a method and a circuit for code generation, and more particularly to a circuit for generating an M sequence or a GOLD code sequence.

2. Description of the Related Art

An M sequence (Maximal-length sequence) is known as a code sequence having superior autocorrelation characteristics. A GOLD code sequence, which is a code sequence obtained by adding two kinds of M sequences having the same cycle, is inferior to the M sequence in the autocorrelation characteristics, and superior to the M sequence in cross correlation characteristics and the number of sequences. Therefore, the M sequence and the GOLD code sequence are very often found in spread spectrum communications, ranging systems, and the like. In mobile communications using the spread code method, an extremely long-code with a length reaching several giga-chips may be used as spreading code, for the spreading signals for identification of base stations, and, in some cases, for other communication stations.

When the long-code is used on a reverse channel from a mobile station to a base station, each mobile station is required to generate the long-code with a timing in synchronization with that of a long-code of a base station to be transmitted, and to start the generation of the long-code with the required timing in response to a transmission request as soon as possible.

The generation of spread codes involves setting a vector consisting of bit strings of a plurality of bits; adding a plurality of pairs of combinations of vectors having 2 as modulo; inputting each added result to a predetermined bit position; circular-shifting the above vectors and sequentially outputting the bit at the predetermined bit position. FIG. 10 is a block diagram of a conventional spread code generation circuit for serially generating long-codes for in-phase and quadrature components (shown as I, and Q, respectively). Vectors VEC91 and VEC92 are stored in shift registers SFG91, SFG92, respectively, and addition of each bit having 2 as modulo is performed by adders L91, L92, respectively. The adders then feed back the added results to the first stages of the shift registers, respectively. The outputs of both shift registers at the final stage are added by an adder ADD81 so as to generate an in-phase component I, and by an adder ADD92 so as to generate a quadrature component Q, after they are shifted by masks M91, M92, respectively. The masks M91, M92 have masking data with the same number of bits as that of the corresponding vector to generate outputs shifted from the outputs of the corresponding shift register by the bit AND and exclusive-OR operations with the corresponding vector, respectively. As mentioned above, spread codes are generated as a result of comparatively complex operations, and it is not an easy task to begin code strings from the midpoint thereof. Although it is, of course, possible to refer to codes corresponding to the timing in a table with all the codes previously stored, a large amount of memories are required for storing very long-codes, and therefore it is unfeasible to provide such memories in mobile stations where smaller size and more reduced electric power have been strongly required. A shift operation of vectors of M sequence by masking is found in detail in U.S. Pat. No. 5,228,054, and "Latest spread spectrum communications technique" written by R. C. Dixon, translated by Toshiya Tateno, and published by Jatech Publication.

When the generation of the long-code is started after the arrivals of the beginning of the long-code cycle, there may be a waiting time corresponding to the total length of the long-code in the worst case, and, in some cases, the waiting time may be longer than a few minutes.

BRIEF SUMMARY OF THE INVENTION

The present invention has been made to solve the above problems by offering a method and a circuit for generating codes enabling transmission of long-codes to start on a reverse channel in shorter waiting time.

The method for generating codes according to the present invention involves discretely determining a timing to start the generation of codes; corresponding a shift quantity between the beginning of an M sequence or a long-code cycle, and each timing to a combination of a plurality of masking data; searching a combination of masking data for a timing to start generation of long-codes in response to a transmission request at a point of time as soon as possible; shifting an initial value of a vector according to the masking data; and starting the generation of long-codes.

DETAILED DESCRIPTION OF THE INVENTION

Figure 1:
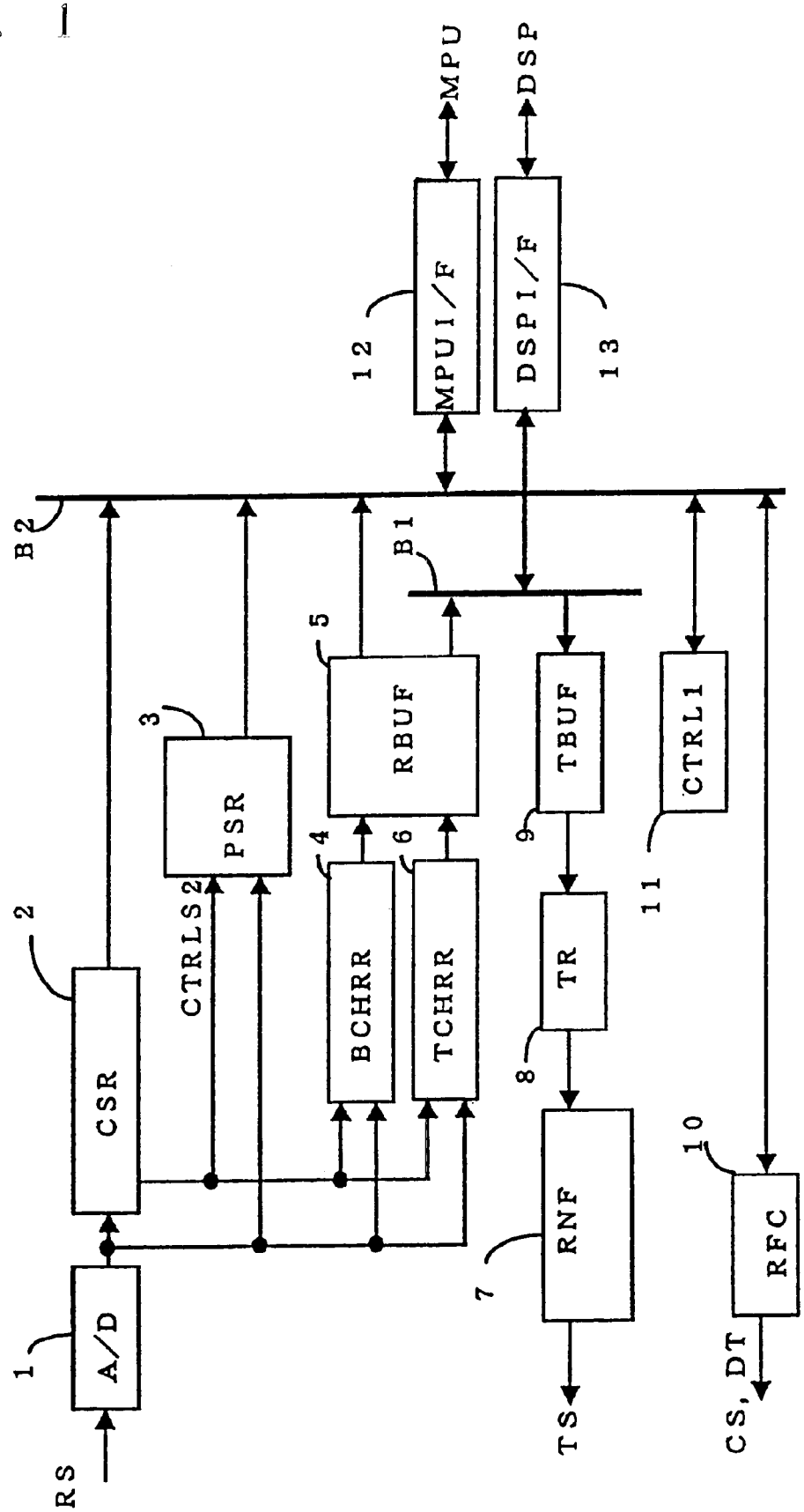
FIG. 1 is a block diagram of the overall configuration of a mobile station according to the method for codes generation of the present invention.

A method and a circuit for code generation according to one embodiment of the present invention will be described below with the reference to the accompanying drawings. FIG. 1 is a block diagram of the overall configuration of a mobile station according to the method for code generation. A received radio frequency signal RS is converted to a base band signal RS, which is further converted to a digital signal by an analog digital (A/D) converter 1. The digital signal is fed in parallel to a cell search circuit 2, a path search circuit 3, a control channel receiving circuit 4, and a traffic channel receiving circuit 6. The outputs of the cell search circuit 2 and the path search circuit 3 are processed by a microprocessor (not shown) through a microprocessor bus B2, and a microprocessor interface 12. A control circuit 11 provided for other controls in the mobile station is driven by an MPU (microprocessor unit) through the bus B2. A radio frequency control circuit 10 provided for control of a radio frequency circuit is also driven by the MPU. A transmitting side of the mobile station is provided with a transmitting buffer 9, to buffer transmitted signals from bus B1 and a transmitting circuit 8 to generate transmitting signals TS obtained by multiplying the data to be transmitted by a spread code, and transmit them from the radio frequency circuit (not shown) after performing a waveform shaping by a transmitting roll-off filter 7. The transmit buffer 9 receives signals from bus B1, which is also connected to a receive buffer 5 and a digital signal processing (DSP) interface 13. The DSP interface receives and outputs digital signals to a digital signal processor DSP. The control of the radio frequency circuit is performed by radio frequency control circuit RFC to output control signals CS, DT to the radio frequency circuit. The above transmitting circuit 8 of the mobile station incorporates various kinds of functions as mentioned above, in which generation of a long-code with a length reaching several gigachips, and by which frequency spreading by the long-code is carried out.

Figure 2:
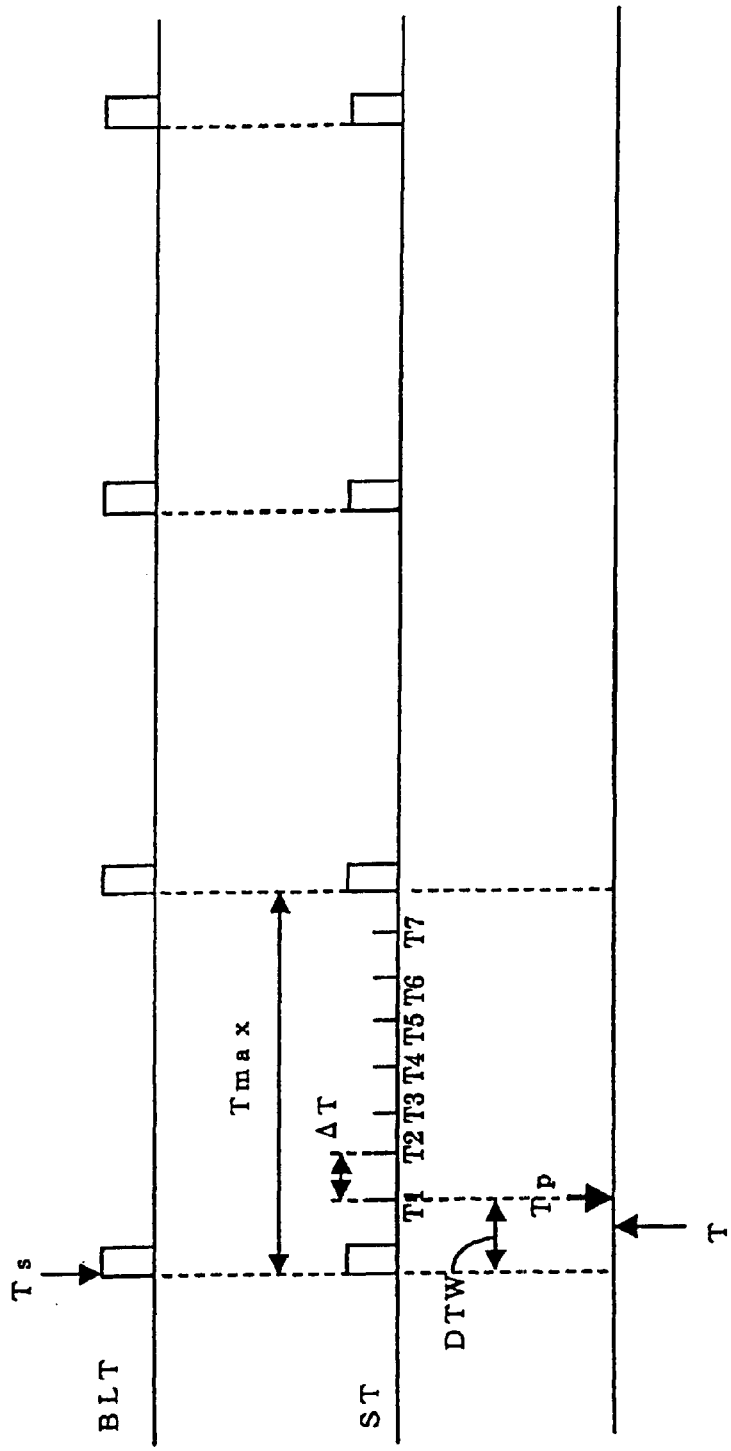
FIG. 2 is a timing chart of long-code cycles of a base station and a mobile station.

FIG. 2 is a timing chart of long-code of a base station and a mobile station. The long-code ST (a period of Tmax) of the mobile station is synchronized with the long-code BLT of the base station to be transmitted at base station and received at mobile station. In the method for generating codes according to the present invention, the period of Tmax is divided into sub-cycles of an equal distance $\Delta T$ (for easier understanding, only 8 sub-cycles appear in the drawing) to generate discrete timings T1, T2, ..., T7. If a request for transmission is made at a point of time T between the beginning of one cycle Ts and the first discrete timing T1, and a predetermined set up period (to be described below) is secured by a point of time T1, the timing Ti is set as a timing Tp for starting the generation of a long-code. When a time distance between the beginning Ts and the timing Tp is supposed to be DTW, a vector with a shift quantity corresponding to the time distance DTW will be given at a point of time T1. According to the inventors, the definition of vectors at Tp is called a "pre-set", since the vector is positioned before the beginning of the next cycle with regard to time.

Figure 3:
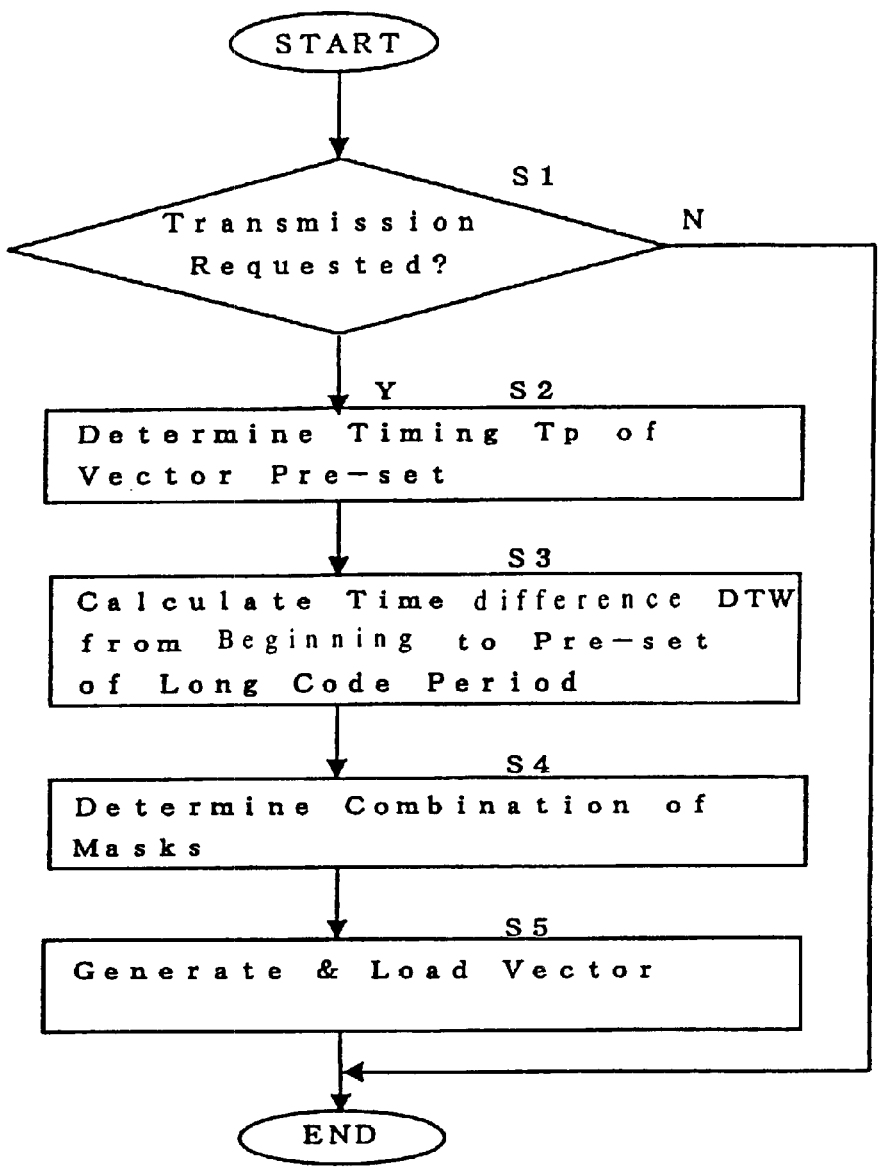
FIG. 3 is a flow chart of the method for generating long-codes in a mobile station.

FIG. 3 is a flow chart of the method for generating long-codes in a mobile station. When there is a request for transmission while monitoring (Step S1), the operation proceeds to the next process to determine the timing Tp (Step S2), otherwise, the process is terminated. In step S3, the timing Tp is determined and the time difference DTW between the beginning of the cycle and Tp is calculated (Step S3).

The present invention uses one or more masks to generate shifted vectors. The shifting of vectors by masks is carried out similar to conventional methods, but there have been previously prepared masks to express all the above discrete timings (i.e. it is possible to generate long code with shifted phase corresponding to required timing).

For example, the number of the above sub-cycles is 2 to the Nth power ($2^N$) and there are prepared masks of shifted quantity corresponding to the weights of each binary digit in this case. In step S4, a combination of masks is determined, and a shift of the initial value of the vector by selected masks is given to generate the shifted vector. Hereinafter, using the vector, a long-code is generated (Step 5).

Figure 4:
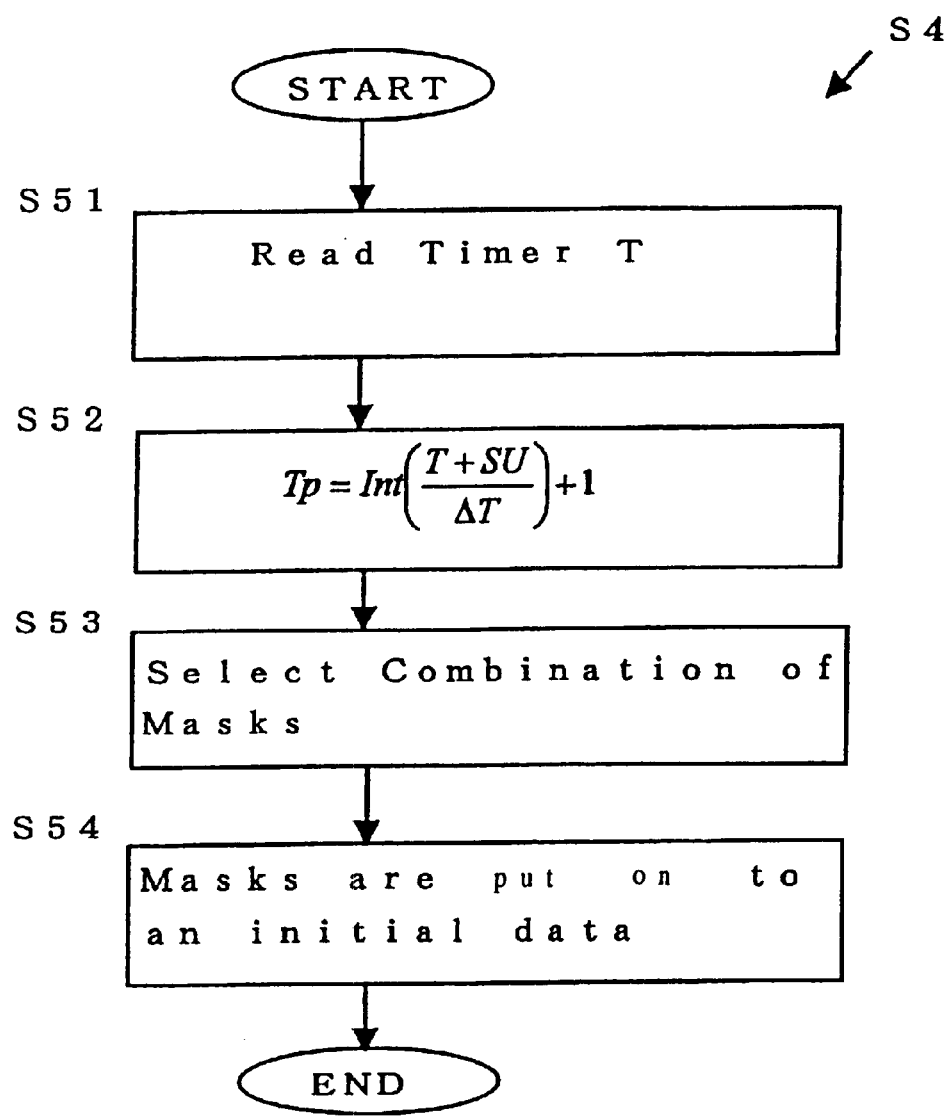
FIG. 4 is a flow chart of the method for selecting a combination of the above masks.

FIG. 4 is a flow chart of the method for selecting a combination of the above masks. Firstly, in order to find the timing of the above pre-set, the present time T is read out (Step 51). Affording a margin (called a setup period SU) for shifting the initial value of the vector to the pre-set timing, (T+SU) is divided by the above sub cycle $\Delta T$. When the result of the deviation becomes an integer, the timing is taken as a value of Tp (Step 52). When calculating TP, a function int (T +SU )/T is used to obtain the maximum integer which is not exceeding the value of the divided result. Therefore, the value of Tp is obtained by adding 1 to the result of the function int (T +SU)/T. A combination of masks corresponding to the timing Tp is then selected (Step 53) to put the masks on an initial data of the vector (Step 54).

Figure 5:
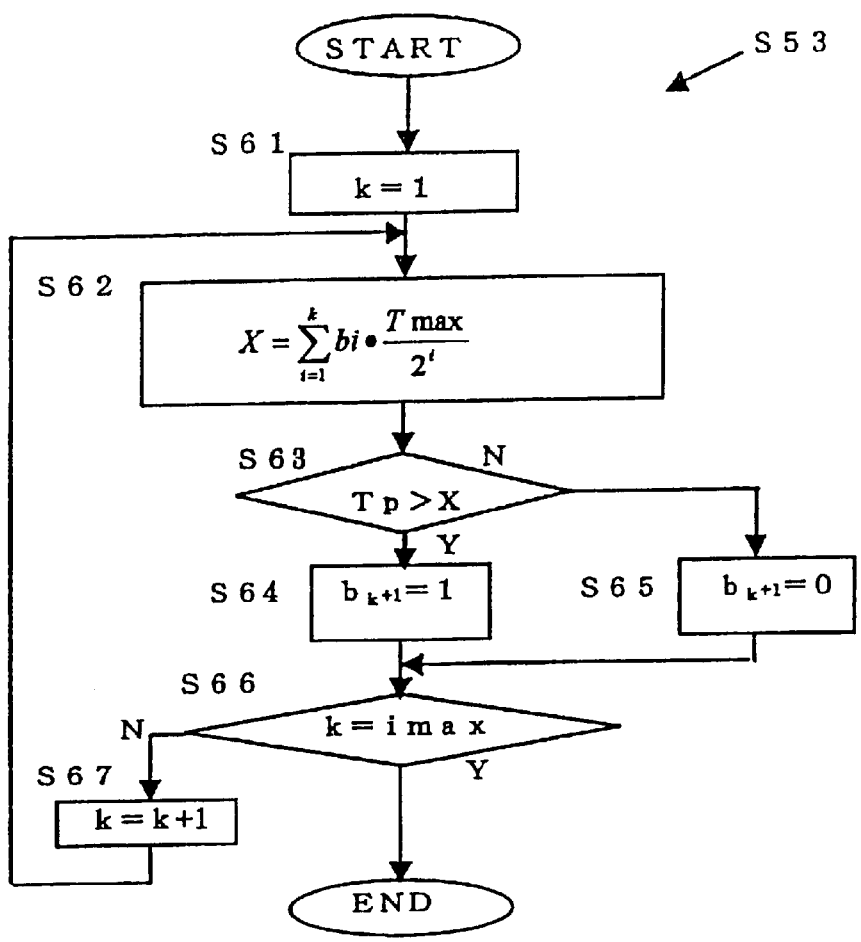
FIG. 5 is a flow chart of an algorithm for selecting a combination of masks by dichotomizing search.

FIG. 5 is a flow chart of an algorithm retrieving a combination of masks by dichotomizing search, when taking the number of the divided sub-cycles as a number of the Nth power of 2 (a number of $2^{imax-1}$). First of all, a loop counter k for the retrieval is initialized (Step 61), as shown in FIG. 5. Then, it is sequentially judged whether masks with a shift quantity of (Tmax/2), (Tmax/4), ..., (Tmax/$2^i$), ..., or (Tmax/$2^{imax-}$) are respectively required. For example, for the first time (k=1), it is judged whether the position of Tp is before or after the center of the long-code cycle (Tmax/2) (Steps S62, S63). When it is positioned after the center, the mask is put on, otherwise, the mask is left off. The putting, or non-putting of the masks is expressed in binary digits (hereinafter, called a control signal CTRLBD), where the most significant bit through the least significant bit (MSB-LSB) is (bimax, bimax–1, ..., b1). When an i-th mask is put on, bi is set as 1 (bi=1) (Step S64), otherwise, as 0 (bi=0) (Step S65). Then, k is increased by 1 (Step S67). When the retrieval is repeated (imax–1) times, that is, k is equal to imax (Step S66), the retrieval is ended.

As mentioned above, an easy shift vector generation can be accomplished only by discretely setting the timing Tp for starting of code generation, and selecting a combination of required masks.

Figure 6:
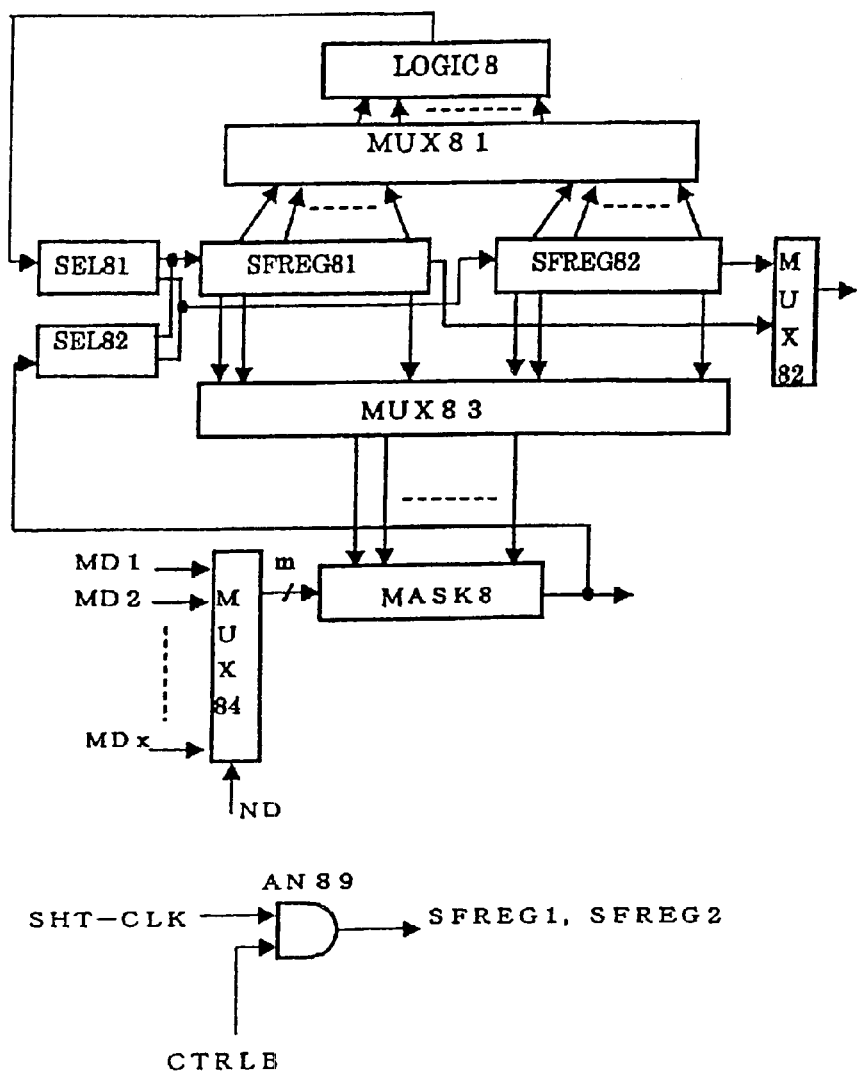
FIG. 6 is a block of a long-code generation circuit of one embodiment according to the present invention.

FIG. 6 is a block diagram of a long-code generation circuit of one embodiment of the current invention. Long-codes are alternately generated by a pair of shift registers SFREG81, SFREG82 to be stored vectors. These shift registers SFREG81, SFREG82 are alternatively connected to a combinational logic circuit LOGIC8 through a multiplexer MUX81. The outputs of the combinational logic circuit LOGIC8 are alternatively input to either of the shift registers SFREG81 or SFREG82 through a selector SEL81. At each circuit, either shift register SFREG81, or SFREG82 is connected to a mask MASK8 through a multiplexer MUX83. Accordingly, the shift register SFREG81 and SFREG82 are configured so that the data from either of them are input to the MASK8.

An initial value of a vector is loaded into SFREG81. Then, the shift register SFREG81 or SFREG82 is alternately used. At first, SFREG81 is connected to LOGIC8 by MUX81 to input the output of LOGIC8 to SFREG81 by SEL81. This enables the long-code generation by the vector n SFREG81.

During the process, a multiplexer MUX83 inputs the data of each circuit SFREG81 to the mask MASK8. In synchronization with generation of the long-code by SFREG81, a shift vector with a predetermined quantity of shifts is generated every one bit in MASK8. The outputs of MASK8 are sequentially input to the shift register SFREG82 by a selector SEL82. When shifting of vectors by the mask is executing, the generated long-code is not used. Alternatively, the mask process is carried out for several subsequent steps. The vector stored in SFREG82 by the first processing is a shift vector by the first mask (for example, a mask for the Tmax/2 shift). For the next long-code generation by SFREG82, the vector shifted by the second selected mask is stored in SFREG82. At this point in time, MUX81 connects SFREG82 to LOGIC8; MUX83 SFREG82 to MASK8; SEL81 LOGIC8 to SFREG82; and SEL82 LOGIC8 to SFREG81. Shift operation of vectors by alternative use of the two shift registers, realizes high-speed setup with the minimum circuit configuration.

Data MD1-MDX of all the masks are connected to the mask MASK8 through a multiplexer 84 followed by a number ND corresponding to all the masks is sequentially input. This permits the mask data to be loaded into MASK8 every one shift operation cycle. The above shift registers SFREG81, SFREG82 do a shift operation in synchronization with a shift clock SHT-CLK, which is input to shift registers SFREG81, SFREG82 through an AND gate AN89. AN89 is opened and closed by the above CTRLB (bimax, bimax–1, . . . ,b1). Since the shift clock is not input when an unused mask is loaded into MASK8, a long-code is not generated, and shifting of vectors is not carried out.

Assuming that only mask data to be used is sequentially loaded into MASK8, it may eliminate the need for control of the shift clock SHT-CLK, reduce the number of the masking processes, and contribute to reducing overall processing time.

A multiplexer MUX82 is connected to the outputs of the shift registers SFREG81, SFREG82, which generate long-codes and are configured so that their output is output of MUX82. The long-codes, which are generated after completion of putting-on of all the required masks, are output from MUX82.

Figure 7:
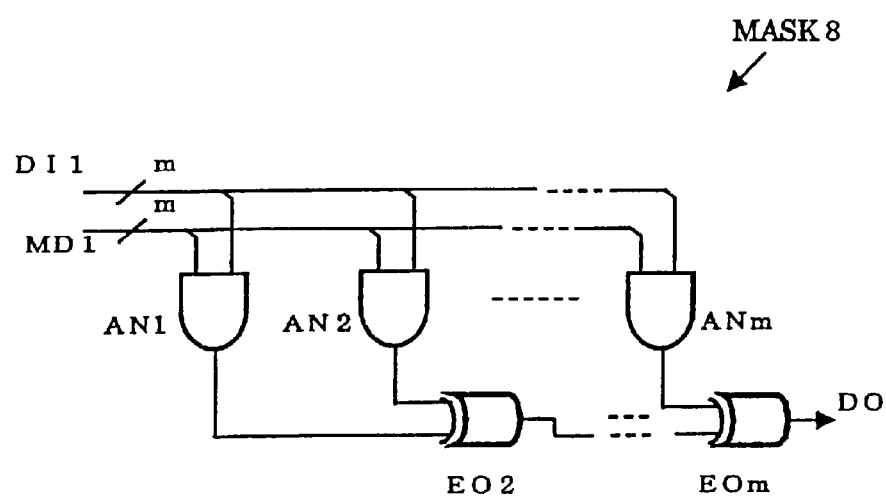
FIG. 7 is an internal circuit diagram of a mask circuit shown in FIG. 6.

In FIG. 7, the mask MASK8 has a plurality of AND gates AN1–ANm, into which corresponding bits of the data of the shift registers at each circuit (shown as D11) and those of the mask data (for example, MD1) are input. The outputs of a pair of AND gates (AN1, AN2) are input to a first circuit EX-OR gate E02. The outputs of E02 and AN3 are input to a second circuit EX-OR gate E03. Similarly, the outputs of the EX-OR gate and those of the corresponding AND gate are input to the next circuit EX-OR gate. Then, the output DO of the final circuit EX-ORm is input to SEL82 as a mask output.

Figure 8:
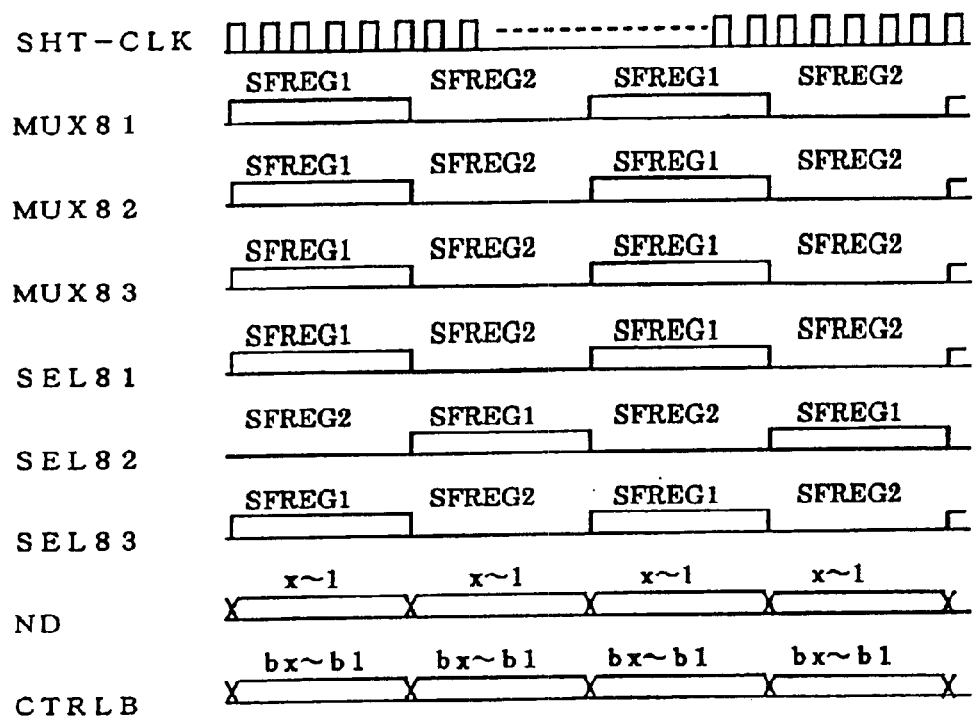
FIG. 8 is a timing chart of control signals for a long-code generation circuit shown in FIG. 6.

FIG. 8 is a timing chart of control signals of the long-code generation circuit. The shift clock SHT-CLK is generated at a constant cycle at all times. The signals of MUX81–MUX83, and SEL81–SEL83 are switched every one cycle to select SFREG81, or SFREG82 alternatively. MUX81–MUX83, SEL81, and SEL83 are set to make the same selection. SEL82 is controlled to make an opposite selection contrary to the above. The signal ND sequentially specifies the number of all the masks from x to 1 every cycle, and CTRLB outputs each bit of (bimax, bimax–1, . . . , b1) every one shift operation cycle.

Figure 9:
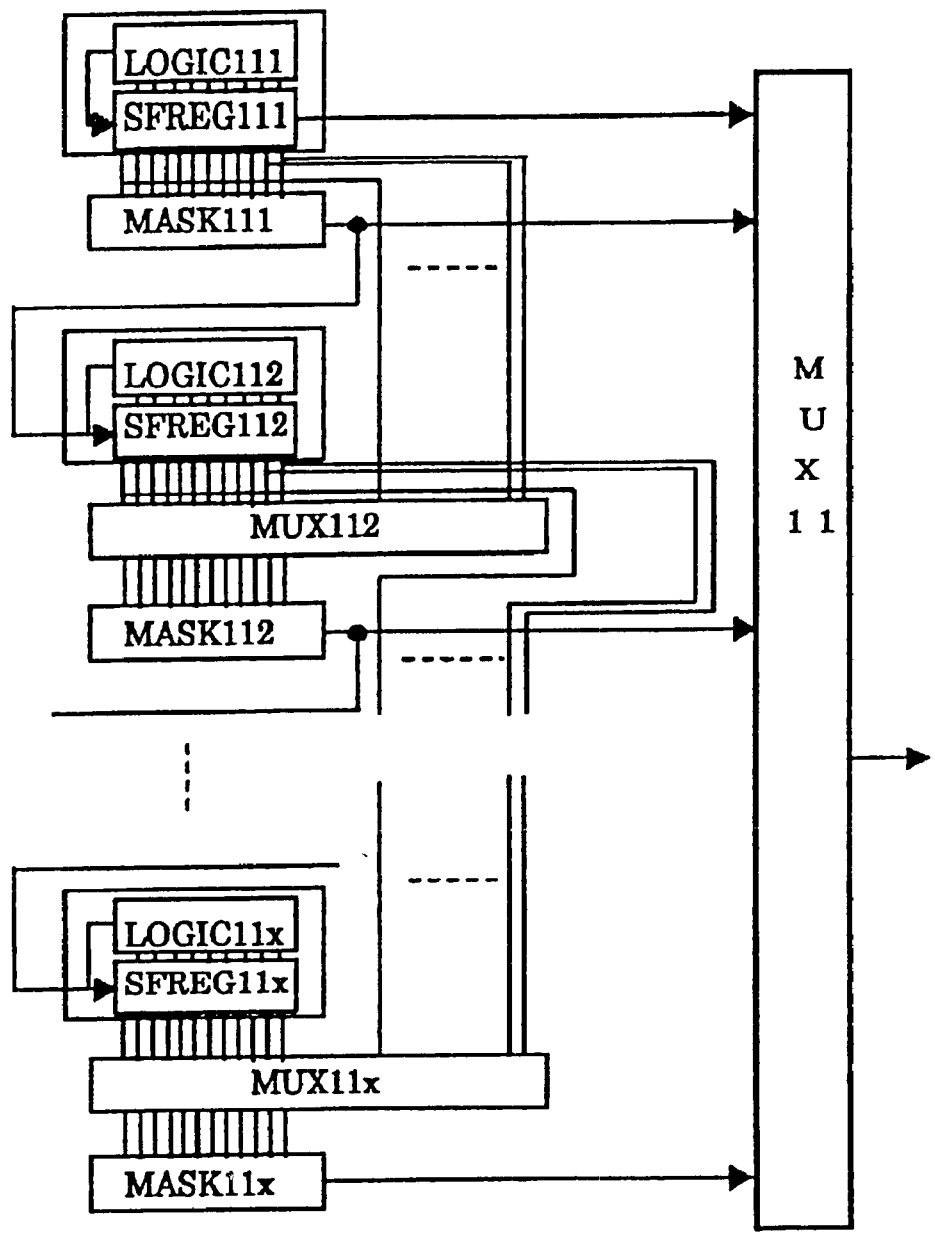
FIG. 9 is a block diagram of a long-code generation circuit of a second embodiment of the present invention.
Figure 10:
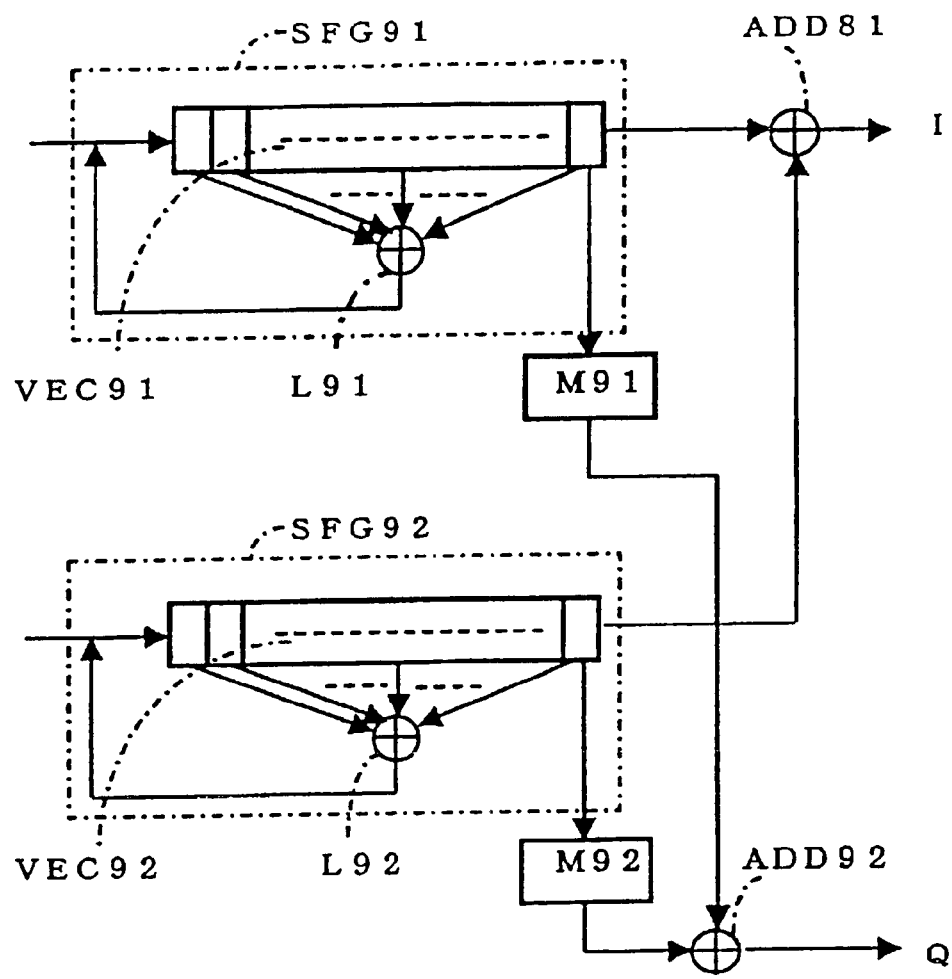
FIG. 10 is a block diagram of a conventional spread code generation circuit serially generating long codes for in-phase or quadrature components

FIG. 9 is a block diagram of the long-code generation circuit of a second embodiment. In this embodiment, shift registers SFREG111–SFREG11x correspond to all the masks. Masks MASK111–MASK11x are connected to the outputs of the shift registers, respectively. Masks MASK112–MASK11x subsequent to the second stage are connected to the corresponding shift registers SFREG112–SFREG11x, or the shift registers SFREG111–SFREG11(x–1) in the previous circuits, through the multiplexers MUX112–MUX11x, respectively. The multiplexers receive data directly from the shift registers, and transfer it to mask that is put on. A multiplexer MUX11 is connected to the first circuit shift register SFREG111, and the masks MASK112–MASK11x subsequent to the second stage for the selection of the output.

The code generation method according to the present invention involves discrete sampling of a timing to start the generation of codes; correspondence of a shift quantity between the beginning of a M sequence or a long-code cycle, and each timing to a combination of masking data for a timing to start the generation of long-codes in response to a transmission request at a point of time as soon as possible; shift of an initial value of a vector according to the masking data; and start of the generation of long-codes. Therefore, the present invention has an excellent advantage that transmission of long-codes on a reverse channel can be started in shorter waiting time.

What is claimed is:

1. A method for code generation wherein the method involves setting of a vector comprising bit strings of a plurality of bits; addition of a plurality of combinations of bits in said vector taking 2 as a modulus; input of each added result to a predetermined bit position; circular-shift of said vector; and output of the bit at said predetermined bit position, in generating a long-code of a mobile station set a long-code cycle in synchronization with that of a base station, the method further comprising the steps of:

dividing one cycle in said long-code cycle of said mobile station into a plurality of sub-cycles;

setting a combination of said sub-cycles, to express a time taking said sub-cycles as unit;

previously generating mask data comprising a bit string corresponding to a number of cyclic shifts corresponding respectively to a period of a combination of said sub-cycles;

when generation of said long codes is required, selecting a pre-set timing at timing taking said sub cycle as a unit in the proximity of immediately after the generation of said long codes is required;

selecting said mask data corresponding to a period between said pre-set timing and the beginning of the long-code cycle including said pre-set timing; and starting said long-code generation from said pre-set timing, using a vector generated by sequential operation of said mask data and an initial value of said vector.

2. The method for code generation according to claim 1, wherein a number of said sub-cycles is N power of 2 ($2^N$).

3. The method for codes generation according to claim 1, wherein selection of said mask data is performed by selecting sequentially masks corresponding to shorter time using dichotomizing search.

4. The method for code generation according to claim 1, wherein a logical product of said vector and the corresponding bits of said mask data is generated for each mask data, and an exclusive-OR of said logical products is generated while cyclically shifting said vector.

5. The method for codes generation according to claim 1, wherein said combination of a plurality of bits comprises predetermined two bits.

6. A circuit for code generation, said circuit comprising:

a shift register of a first-stage storing an initial value of a vector;

a mask of multi-stages, each corresponding to respective mask data, storing the corresponding mask data, performing logical products and further exclusive-OR operations with input vectors;

a shift register of multi-stages provided to correspond to said masks storing outputs of masks at each stage;

a first multiplexer of the multi-stages outputting each bit of said shift register of the first-stage, or selectively that of said shift register of the first-stage to a mask of a second-stage, and a first multiplexer subsequent to the second-stage outputting each bit of said shift register subsequent to the second-stage, or selectively that of a shift register of a previous-stage to a mask subsequent to a third mask; and a second multiplexer selectively outputting any one of the outputs of said first-stage shift register, and the output of each mask.

* * * * *